(12) United States Patent
Childress

(10) Patent No.: US 6,430,544 B1
(45) Date of Patent: Aug. 6, 2002

(54) SINGLE VARIABLE PRIORITY CONSTRAINT FUZZY CONTROL SYSTEM

(76) Inventor: Ronald Childress, 373 Fuller Dr., Easley, SC (US) 29640

(*) Notice: Subject to any disclaimer, the term of this patent is extended or adjusted under 35 U.S.C. 154(b) by 0 days.

(21) Appl. No.: 09/132,480

(22) Filed: Aug. 11, 1998

(51) Int. Cl.[7] .............................................. G06F 15/18
(52) U.S. Cl. .................. 706/1; 706/4; 706/8; 706/900; 706/903
(58) Field of Search ........................... 706/1, 8, 4, 900, 706/903

(56) References Cited

U.S. PATENT DOCUMENTS

| | | | |
|---|---|---|---|
| 4,875,184 A | * 10/1989 | Yamakawa ..................... | 706/3 |
| 5,131,071 A | 7/1992 | Tsutsumi ....................... | 706/4 |
| 5,159,547 A | * 10/1992 | Chand ......................... | 706/900 |
| 5,184,131 A | * 2/1993 | Ikeda .......................... | 341/165 |
| 5,245,695 A | 9/1993 | Basehore ....................... | 706/4 |
| 5,264,933 A | 11/1993 | Rosser et al. ................. | 348/578 |
| 5,305,424 A | * 4/1994 | Ma et al. ...................... | 706/52 |
| 5,335,314 A | * 8/1994 | Tsutsumi et al. ............... | 706/1 |
| 5,357,421 A | * 10/1994 | Tautz et al. .................... | 706/1 |
| 5,371,832 A | 12/1994 | Eichfeld et al. ................ | 706/4 |
| 5,397,973 A | 3/1995 | Dummermuth ............. | 318/628 |
| 5,400,435 A | 3/1995 | Nishimure ..................... | 706/4 |
| 5,412,752 A | * 5/1995 | Basehore et al. .............. | 706/4 |
| 5,422,978 A | 6/1995 | Oh et al. ....................... | 706/2 |
| 5,433,079 A | * 7/1995 | Badami et al. ............... | 60/660 |
| 5,459,816 A | * 10/1995 | Basehore et al. .............. | 706/1 |
| 5,463,719 A | 10/1995 | Okazaki ....................... | 706/52 |

(List continued on next page.)

OTHER PUBLICATIONS

Watanabe, et al., A VLSI Fuzzy Logic Controller with Reconfigurable, Cascadable Architecture:, IEEE Journal of Solid–State Circuses, vol. 2, No. 2, pp. 376–382, Apr. 1990.

Rolf Isermann, "On Fuzzy Logic Applications for Automatic Control, Supervision, and Fault Diagnosis", IEEE Transactions on System, Man and Cybernetics, Mar. 1998.*

Vachkov et al, "Reducing the High Dimensionality Problem in Fuzzy Dynamic Models", Proceedings of the 5th IEEE International Conference on Fuzzy Systems, Sep. 1996.*

*Primary Examiner*—George B. Davis
(74) *Attorney, Agent, or Firm*—Duane Morris

(57) ABSTRACT

A fuzzy logic controller system comprising a plurality of fuzzy logic controller units cascadably coupled to one another, each controller having a membership processor for receiving a single input signal corresponding to a sensed parameter from a controlled system and performing fuzzy inference operations based on the input signal for outputting an incremental output signal indicative of a requested change in a controlled output from a current level, a permissions processor for scaling the incremental output signal in response to a fulfillment signal from another controller, a processor responsive to the membership processor and to the permissions processor for providing a fulfillment signal to another controller indicative of a permissible range of freedom for scaling the incremental output signal of the another controller in the cascading sequence, an adder for summing each of the incremental output signals from the plurality of controllers and applying the sum to the controlled output for providing a correction to the current level of the controlled output, wherein the fulfillment signal output from the controller operates to constrain the incremental output signal and influence of subsequent downstream controllers.

33 Claims, 13 Drawing Sheets

FIG. 8

U.S. PATENT DOCUMENTS

| | | | | |
|---|---|---|---|---|
| 5,497,063 A | | 3/1996 | Day et al. | 318/610 |
| 5,499,319 A | | 3/1996 | Sultan et al. | 706/1 |
| 5,559,928 A | | 9/1996 | Ota et al. | 706/8 |
| 5,561,738 A | * | 10/1996 | Kinerk et al. | 706/4 |
| 5,615,303 A | | 3/1997 | Abruzzese et al. | 706/4 |
| 5,621,860 A | | 4/1997 | Russo et al. | 706/4 |
| 5,631,845 A | * | 5/1997 | Filev et al. | 700/266 |
| 5,633,986 A | | 5/1997 | Rizzotto et al. | 706/1 |
| 5,655,056 A | | 8/1997 | Tasaka | 706/1 |
| 5,657,427 A | | 8/1997 | Rizzotto et al. | 706/1 |
| 5,673,365 A | * | 9/1997 | Basehore et al. | 706/4 |
| 5,719,999 A | * | 2/1998 | Nishidai et al. | 706/3 |
| 5,748,467 A | * | 5/1998 | Qin et al. | 700/50 |
| 5,764,855 A | * | 6/1998 | Künemund | 706/4 |
| 5,806,052 A | * | 9/1998 | Bonissone et al. | 706/4 |
| 5,826,251 A | * | 10/1998 | Kiendl | 706/52 |
| 5,895,458 A | * | 4/1999 | Nishidai et al. | 706/8 |
| 5,910,175 A | * | 6/1999 | Malson | 701/57 |
| RE36,421 E | * | 11/1999 | Ohtsubo et al. | 706/4 |

* cited by examiner

FIG. 5

| AA1 VIEW Rev. 1.145 | | | |
|---|---|---|---|
| APCO Purchase Power Constraint | | FB1 Steam Limits | | Debug Graphic |
| 27.20 / 1.000 | 0.000 / 1.000 | 246.90 / 0.048 | 0.000 / 0.048 | TG1 MW | 28.48438 |
| | | | | TG1 MW SP Load | 28.78702 |
| TG1 Generation MW Limit | | 900# Header Pressure Limit | | TG1 V1 | 94.39844 |
| 28.40 / 1.000 | 0.000 / 1.000 | 892.30 / 0.048 | 0.000 / 0.048 | TG1 V2 | 69.39844 |
| | | | | TG1 V3 | 6.699219 |
| TG1 V3 Valve Position Limit | | RTP Incremental Cost Detector | | 900# Header Pressure | 892.4 |
| 6.70 / 1.000 | 0.330 / 0.340 | 2.30 / 0.048 | 0.002 / 0.026 | FB1 Steam Flow | 248.2 |
| | | | | APCO Purchase Power | 27.1 |
| TG1 V2 Valve Position Limit | | 900# Header Pressure Assistance | | cc_001 INCOUT | 0 |
| 69.30 / 0.340 | 0.000 / 0.340 | 892.30 / 0.026 | 0.000 / 0.026 | cc_002 INCOUT | 0.3300781 |
| | | | | cc_003 INCOUT | 0 |
| TG1 V1 Valve Position Limit | | PB1 Steam Load Centering | | cc_004 INCOUT | -2.989563E |
| 94.30 / 0.340 | -0.029 / 0.048 | 246.90 / 0.019 | 0.001 / 0.026 | cc_005 INCOUT | 0 |
| | | | | cc_006 INCOUT | 0.3001825 |
| | | | | BLK_001 OP | 0 |
| | | | | cc_007 INCOUT | 1.880823E |
| | | | | cc_008 INCOUT | 0 |
| | | | | cc_009 INCOUT | 5.718519E |
| | | | | cc_010 INCOUT | 0 |
| | | | | BLK_002 op | 28.78702 |
| | | | | TG1 MW Setpoint | 28.78702 |
| | | | | TG1 MW SP Mode | 1 |
| | | | | Cost + Make · Buy | 2.3 |

AN SVPCC CONFIGURATION AND DETAIL DISPLAY GRAPHIC

CONTROL SYSTEM CONNECTIONS WITH SEPARATE INCREASE AND DECREASE MOVE PERMISSIVES

SINGLE VARIABLE PRIORITY CONSTRAINT FUZZY CONTROL SYSTEM

FIELD OF THE INVENTION

The present invention relates generally to logic control systems, and more particularly, to a priority based constraint controller system comprising a plurality of cascaded single variable priority constraint controllers for controlling a system having multiple variables and constraints.

BACKGROUND OF THE INVENTION

Control systems and computer-controlled electronic devices have historically been controlled by digital control systems. Such control systems use bi-state digital logic which requires a value of either "TRUE" or "FALSE, so that approximations are often required of real-world control problems. For example, an input/output relationship y=f(x) would be specified either as a mathematical function or as a series of points using, for example, a look-up table. The former use of a mathematical function may require complex mathematics to accurately represent real-world control problems. Further, the latter use of a look-up table, such as a ROM, introduces problems such as large memory requirements for adequate approximation, the concomitant addressing function associated with large memories, as well as interpolation problems.

For example, FIG. 1A shows an exemplary nonlinear sigmoidal function y=f(x). If digital logic was used to characterize the function y=f(x), it would be necessary to approximate the function shown in FIG. 1A by using discrete values, $y_i=a_i \cdot x_i$ (I=1,2, ..., n), as shown in FIG. 1B. Since the number n of "crisp" values is limited, there inherently exists an interpolation error for values of x between $x_i$ and $x_{i+1}$. The term "crisp" refers to an input having a single discrete value. In addition, it becomes impractical to write a rule for every input combination where there exists a large number of inputs whose values can cover a wide input range.

An alternative approach to control theory, known as "fuzzy logic", was developed by L. Zadeh in 1963. Rather than evaluating the two values "TRUE" and "FALSE" as in digital logic, fuzzy terms admit to degrees of membership in multiple sets so that fuzzy rules may have a continuous, rather than stepwise, range of truth of possibility. For example, in applying fuzzy logic, a person need not strictly be included or excluded as a member from a set of "tall persons"; rather, to the extent a person may be "tall" to a greater or lesser degree, the member is assigned to the set with a degree of membership between the values of "1" and "0".

FIG. 1C illustrates the principle of fuzzy logic in evaluating the function illustrated in FIG. 1A. The function f(x) is approximated by a plurality of fuzzy sets 10 which overlap. Rather than approximating a continuous value x by a discrete value $x_i$, logic determines for a given value x whether the value x is nearest to the center of a fuzzy set 10. If an x value is equidistant from two or more fuzzy sets, the resultant y value can be made proportional to the output values suggested by all the fuzzy sets of which the value x is a member. Thus, a fuzzy number may be two dimensional, having assigned fuzzy sets and corresponding membership values.

Since fuzzy logic can operate within the relative imprecision of the real-world environment, the advantages of fuzzy logic and fuzzy set theory have become apparent in numerous areas, such as robotics, natural language recognition, the automobile and aircraft industry, artificial intelligence, etc.

The implementation of fuzzy logic for a controller has been shown in U.S. Pat. No. 5,655,056 entitled "FUZZY CONTROLLER GROUP CONTROL SYSTEM". This patent discloses a system in which a plurality of fuzzy controllers are interconnected by a communication line and the parameters of rules and membership functions of each fuzzy controller are capable of being adaptively changed, depending upon the state of the controlled system so as to improve the control performance of the overall system. In this patent, the CPU unit of each fuzzy controller acts to adaptively alter the presently prevailing rule and membership function based on the information from other fuzzy controllers in order to improve performance.

Another prior art controller is described in a publication of the IEEE Journal of Solid State Circuits, vol. 25, No. 2, April 1990 entitled "A VLSI FUZZY LOGIC CONTROLLER WITH RECONFIGURABLE, CASCADABLE ARCHITECTURE", by Hiroyuki Watanabe et al. This article discloses a general background on fuzzy logic devices along with an illustration of a cascadable architecture. Still another implementation is shown in U.S. Pat. No. 5,131,071 entitled "FUZZY INFERENCE APPARATUS" which discloses multiple inference sections (10) whose output is integrally processed by a concluder section (110) and having a membership function generating circuit array which allows switching of the inference system in a time series fashion to enable a hierarchically oriented system to be achieved. However, each of these prior art control systems comprise complex multi-variable inputs and outputs for each fuzzy controller from/to sensors in order to operate and control a complex multi-variabled system. Furthermore, such prior art control systems do not provide a priority-based method of using an upstream fulfillment value to adaptively scale the incremental output of each subsequent fuzzy controller, thereby permitting the operation of certain fuzzy controllers to either dominate or be subordinate to other controllers within the system. Accordingly, it is highly desirable to obtain a priority constraint control system using single variable priority constraint controllers cascadable within an architecture to prioritize constraints for permitting the system to take into account multiple variables and constraints.

SUMMARY OF THE INVENTION

It is an object of the present invention to provide a fuzzy logic controller system comprising a plurality of fuzzy logic controller units cascadably coupled to one another, each controller having membership processing means for receiving a single input signal corresponding to a sensed parameter from a controlled system and performing fuzzy inference operations based on the input signal for outputting an incremental output signal indicative of a requested change in a controlled output from a current level, permission means for scaling the incremental output signal in response to a fulfillment signal from another controller, fulfillment means responsive to the membership processing means and to the permission means for providing a fulfillment signal to another controller indicative of a permissible range of freedom for scaling the incremental output signal of another controller in the cascading sequence, and summing means for summing each of the incremental output signals from the plurality of controllers and applying the sum to the controlled output for providing a correction to the current level of the controlled output, wherein the fulfillment signal output from the controller operates to constrain the incremental output signal and influence of subsequent downstream controllers.

It is a further object of the present invention to provide a method for operating a fuzzy controller group control system, including a plurality of fuzzy controllers, for controlling an output parameter, comprising the steps of for each said fuzzy controller in the group, receiving a single input variable from a controlled system and performing fuzzy inference operations for outputting an incremental output indicative of a requested change in the output parameter from a current level, adaptively scaling the incremental output of each controller by an at least one signal output from a previous controller indicative of a permissible range of freedom for varying the incremental output, and summing the scaled incremental outputs from each of the plurality of fuzzy controllers and applying the sum to the current output parameter to obtain an updated output parameter.

BRIEF DESCRIPTION OF THE DRAWINGS

FIG. 5 provides a graphic display of a ten variable priority constraint controller control system.

DETAILED DESCRIPTION OF THE INVENTION

Figure 1A:
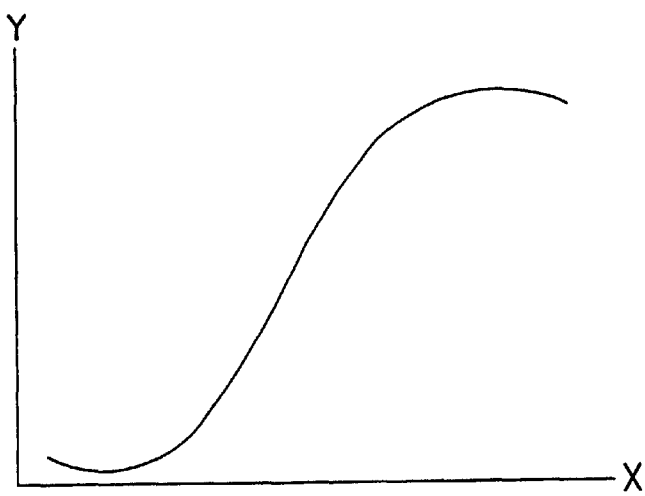
FIGS. 1A, 1B and 1C illustrate the logical distinction between digital logic and fuzzy logic.
Figure 1B:
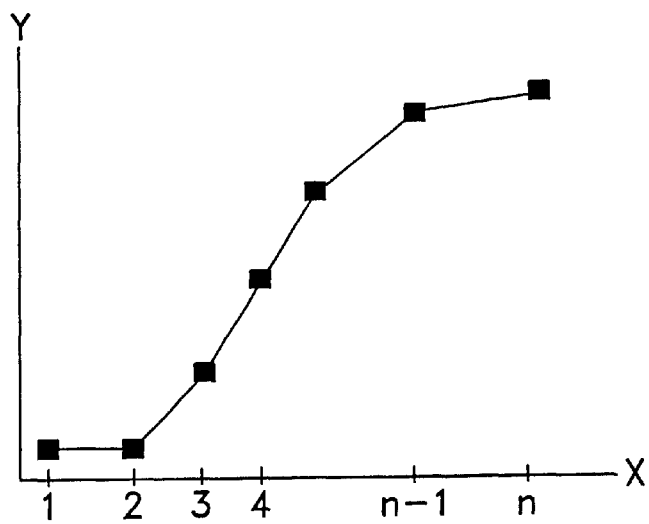
Figure 1C:
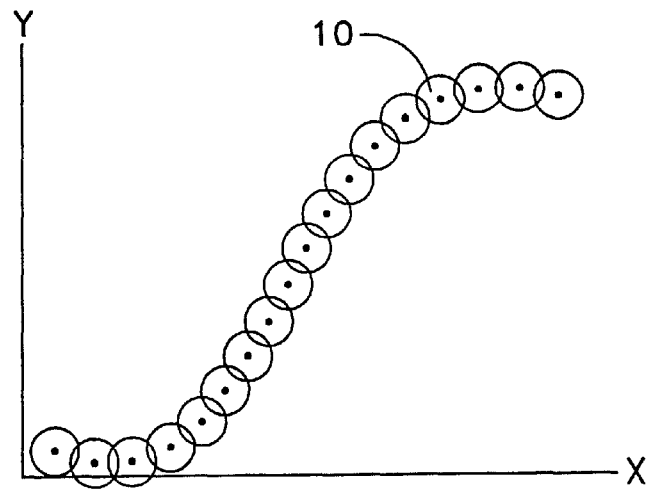

Before embarking on a detailed description of the present invention, the following should be understood. A number of the control systems in operation are implemented through the use of Proportional-Integral-Differential (PID) controllers, rather than fuzzy control systems. PID controllers provide a generalized function which is the sum of: (1) an error signal times a proportional gain factor ("P-gain"), (2) the integral of the error signal times an integral gain factor ("I-gain"), and (3) the derivative of the error signal times the derivative gain factor ("D-gain"). By adjusting the P,I, and D gain factors, a wide variety of transfer functions may be affected which, when combined with a physical transfer function of a control process, produces a desired system response.

Selecting the proper P,I, and D gain factors to produce a desired system response has been the subject of considerable study. If the transfer function of the physical system to be controlled is well known and may be approximated by a linear system, the appropriate P,I, and D gain factors may be calculated according to desired trade-offs and by a number of well known methods. More typically, however, the precise transfer characteristics of the physical system are not well known and/or are non-linear. In these cases, the proper gain factors may be approximated, typically by a human expert applying "rules of thumb".

The use of fuzzy logic in place of PID controllers allows one to utilize techniques for controlling mathematically ill-understood processes. In fuzzy logic, the rules of thumb of experts are captured as fuzzy decision rules that are used to approximate the trade-offs that would be made by a human expert. Generally, fuzzy logic first maps one or more analog inputs to several fuzzy states defined by overlapping membership functions. For example, if the input is temperature, the membership functions might be those of "cold", "tepid", or "hot", and serve to characterize any given input of one of three types to varying degrees.

Those systems which have been implemented using fuzzy control logic generally provide output which is independent of other fuzzy controllers within the system. In cases where communication does exist among the fuzzy logic controllers, such communication functions to modify a rule or membership function, rather than constrain, arrange, or provide output to another controller. The key to the present invention is the use of output signals representing upstream or downstream permissives to increase or decrease the output, such that a permissive from one controller is passed downstream to another controller. In this manner, the controllers may be chained together so that higher level controllers have priority over lower level controllers.

The control system of the present invention may be used for controlling a wide variety of systems including industrial and domestic processes and robotics. This system, as will be described herein, provides a Fuzzifier, a single dimensional controller and prioritizer into a single function block. Multiple function blocks are chained together to build a prioritized constraint or "tunnel" control system capable of taking multitudes of variables and constraints into account.

Figure 2A:
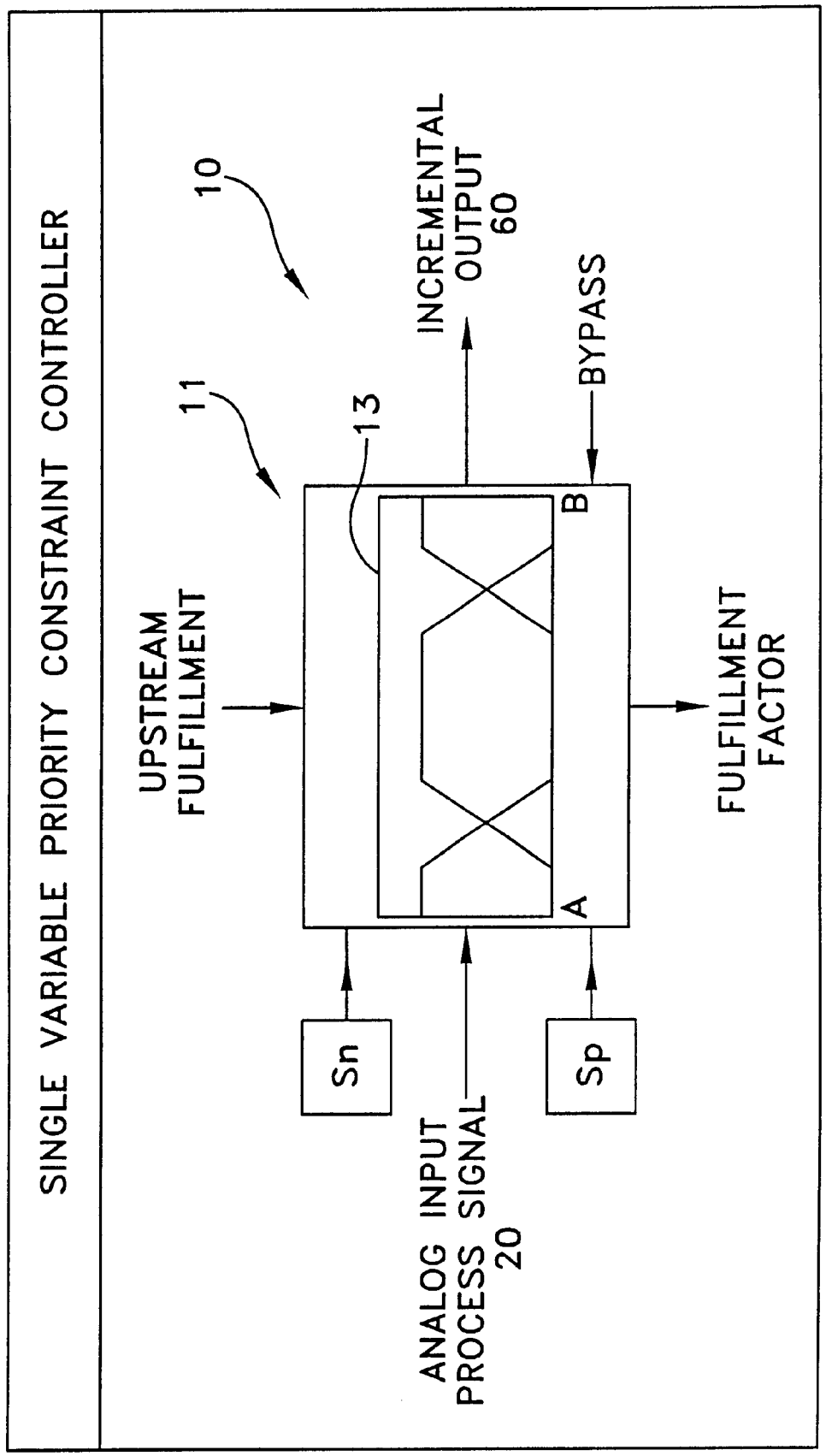
FIGS. 2A and 2B show a schematic view and detailed view, respectively, of a single variable priority constrain controller according to the present invention.
Figure 2B:
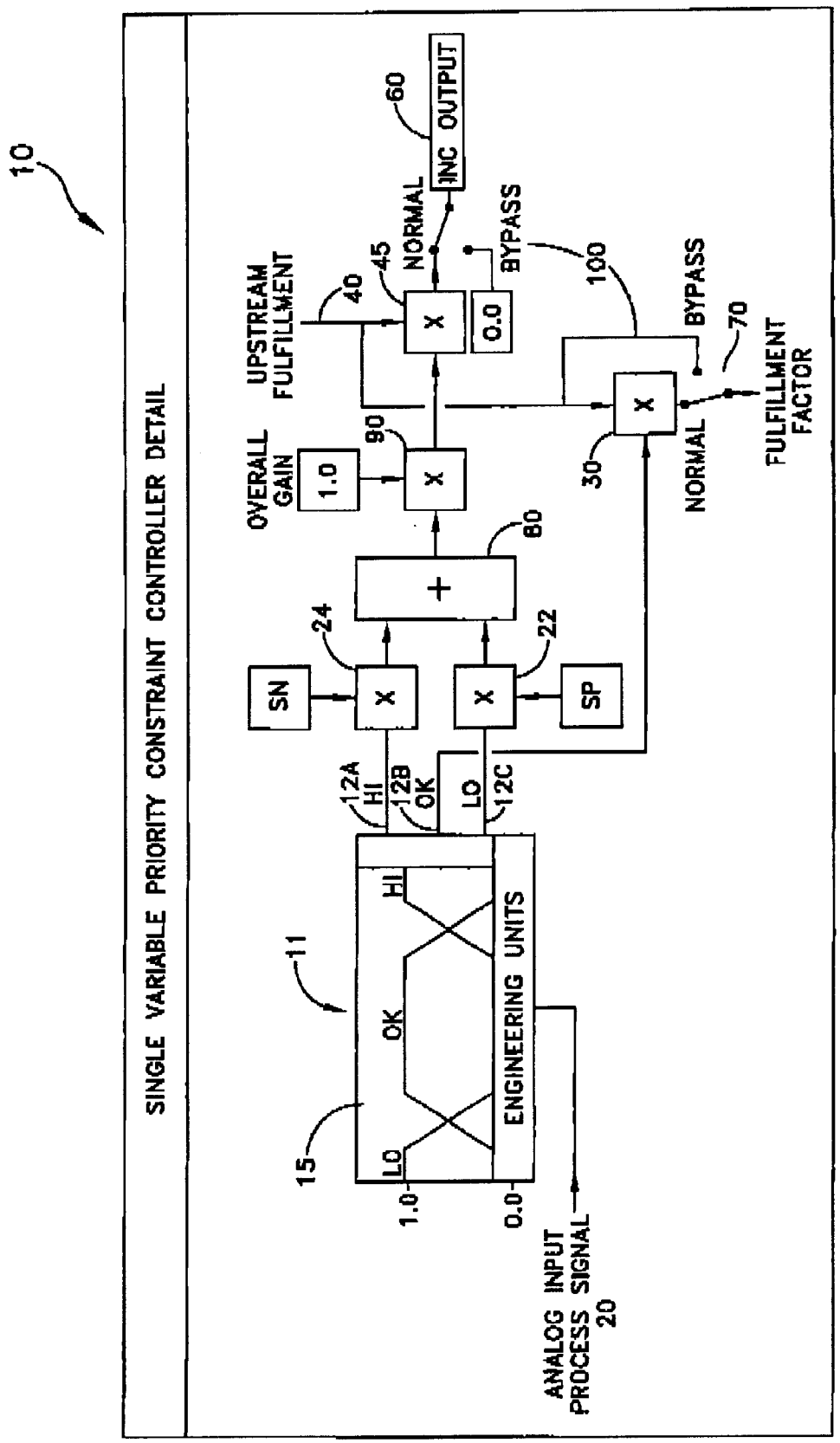

Referring now to FIGS. 2A–B, there is shown schematic and detailed views, respectively, of a single variable priority constraint controller (10) according to the present invention. An analog input signal 20 is input to fuzzy controller 10 as a process signal. The analog input process signal 20 may be thought of as a value between 0 and 100%, such that the horizontal axis within processor 11 represents a range of 0–100%, and the vertical scale ranges between 0 and 1, in arbitrary units. The processor 11 includes a membership function set 13 with a domain which spans the expected range of the input process signal and a normalized range between 0 and 1. Domain limits A and B serve as reference points against which the individual membership functions are defined. Referring to FIG. 2B, membership function set 13 comprises three membership functions 15. That is, each controller has an analog input signal or measurement input 20 output from a sensor associated with the controlled system that is fuzzified into three membership functions 15. The memberships are typically assigned names such as "Below Normal" (i.e. low), "Normal" (i.e. OK), and "Above Normal" (i.e. high). For example, if the analog input signal in engineering units is 0, then the truth of the low membership function is represented as 1, truth of the OK membership is 0, and truth of the high membership is 0. As one moves in a positive horizontal direction in engineering units indicative of an increase in value of the analog input process signal, the truth of that signal being low drops from 1 to 0 as the OK membership's truth value increases from 0 to 1. Accordingly, each membership function has a truth: namely low, OK, and high. Each truth varies from 0 to 1 depending on the value of the input signal, such that the sum of all truth values is equal to 1. Each membership function and the number of membership functions may be varied as understood by those of ordinary skill in the art. In the preferred embodiment shown in FIG. 2B, the membership functions are trapezoidal in shape. Each of the membership functions match the values of the analog input process signal 20 to a corresponding output membership value signal 12, which have been formed by the association of fuzzy rules with those membership functions based on the level of the input signal. For example, a rule associated with the low membership function may be such that if the input is low, then provide a small positive increase. Similarly, the rule associated with the normal membership function may be that if the input signal is within the normal range, then take no action; while the rule associated with the high range may be such that the input signal is high, then provide a decrementing signal. Thus, as shown in FIG. 2B, signals 12A, 12B, and 12C output from control unit membership function processor 15 are indicative of the values associated with the high, OK, and low membership functions and rules respectively, for the applied input signal 20. As shown in FIG. 2B, output signal 12B is input to multiplier 30 which multiplies signal 12B by an upstream fulfillment signal 40 indicative of the level of freedom or permission which this particular controller has been granted from another upstream controller (not shown). That is, upstream fulfillment signal 40 has a value ranging from 0 to 1, where 1 represents 100% freedom for fuzzy controller 10, while 0 is indicative of a total constraint or no permission to either provide an incremental output signal 60, or to influence subsequent downstream controllers (shown in FIG. 3) via output fulfillment factor signal 70. As one can ascertain, the fulfillment factor 70 output from one particular fuzzy controller 10 is then input to the next downstream fuzzy controller as input signal 40. This signal represents the product of the "normal" signal value 12B and the upstream fulfillment signal 40 from the previous upstream fuzzy controller. The incremental output signal 60, which is indicative of the relative amount of movement from the present value of a controlled output requested by the particular fuzzy controller 10 based on the particular input variable 20, is obtained as follows. Multiplier 22 operates to multiply LO signal 12C by adjustor signal Sp. Similarly, multiplier 24 operates to multiply high signal 12A by adjuster signal Sn. The multiplied signals are added together via adder 80 and then multiplied by gain controller 90 and upstream fulfillment factor signal 40 via module 45 to provide incremental output signal 60.

The operation of the above described fuzzy logic controller may be summarized as follows. As long as the input value 20 is in the "Normal" or OK range (which means that the truth of the signal being normal is "1"), no output is made (0 incremental output). If the input value is "Below Normal", an incremental output is made that is equal to the truth of the "Below Normal" membership (range 0 . . . 1) times the output movement (in this case signal Sp means small positive move which may have a value of +0.01% of the output assigned) times the upstream fulfillment value 40 (having a range 0 . . . 1) times the Overall Gain 90. Likewise, if the input value is "Above Normal", incremental output 60 is made that is equal to the truth of the "Above Normal" membership 12A (range 0 . . . 1) times the output movement (Sn is indicative of small negative move which may have a value of −0.01% output assigned) times the upstream fulfillment factor 40 times the overall gain 90. The truth of the "Normal" membership value 12B times the upstream fulfillment factor 40 is output as the downstream fulfillment factor 70 (range 0 . . . 1).

As one can ascertain, the downstream fulfillment factor 70 constrains a subsequent receiving (i.e. cascaded) downstream controller whenever the "Normal" membership truth is less than one.

A bypass unit 100 comprising a pair of bypass switches coupled respectively to the incremental output 60 and fulfillment factor 70 operate in response to a control signal (not shown) to force a fuzzy controller incremental output to 0 and to simply pass the upstream fulfillment factor signal 40 downstream to the next cascaded fuzzy logic controller. In this manner, any particular single variable constraint controller may be effectively removed from the controlling system, thereby eliminating any influence on the ultimate output of the control system from a particular input signal variable.

Figure 3:
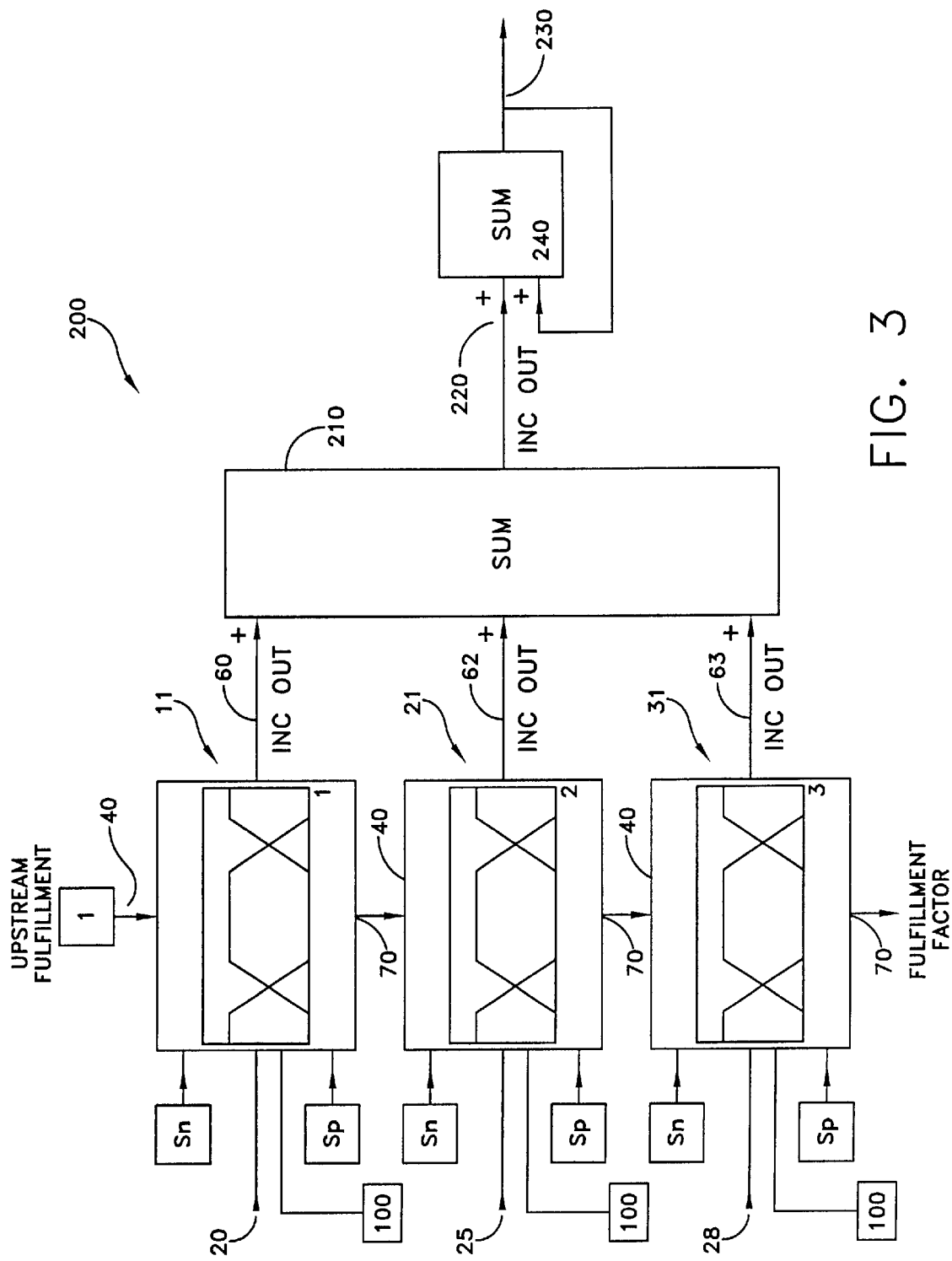
FIG. 3 provides a schematic illustration of a multiple prioritized constraint control system according to the present invention.

As shown in FIG. 3, a priority based constraint controller system 200, is implemented by cascading the fulfillment factors 40/70 from each of fuzzy logic controllers 11, 21, 31 with the next downstream controller. Referring to FIG. 3, the topmost controller (11) must be in a "Normal" range before the next downstream controller (21) can make a move. The controller 21 must be in a "Normal" range before the next downstream controller (31) can operate, and so forth. Since each of the fulfillment factors range from 0 to 1, the constraints are soft or "fuzzy". Therefore, if controller 11 provides an output that is somewhat "Normal" (i.e. having a value between 0 and 1), then downstream controller 21 can perform partially based on the upstream fulfillment signal.

As one can ascertain, multiple controllers compete for "control" of the output, but upstream controllers have a higher priority than their downstream partners. Some controllers may "vote" positive incremental outputs, while others "vote" negative incremental outputs, based on the values of their respective input process signal variables 20, 25, and 28. Each of the incremental outputs 60, 62, and 63 output from the respective fuzzy logic controllers 11, 21, 31 are then summed via adder 210 to provide an overall incremental output 220 which is then applied to the existing output signal 230 via adder 240 to provide an overall output control signal reflective of the aggregation of the individual incremental outputs or "votes" from each single variable controller.

It is interesting to note that the constraints are "soft" or "spring like". That is, as one controller pushes against another constrained controller, the compression of the constraint is varied depending on the aggressiveness (i.e. fulfillment value) of the other controllers. Moreover, as previously mentioned, bypass switch 100 is provided to force a particular controller incremental output to zero and simply pass the upstream fulfillment factor downstream to the next controller in the cascaded sequence.

Figure 4:
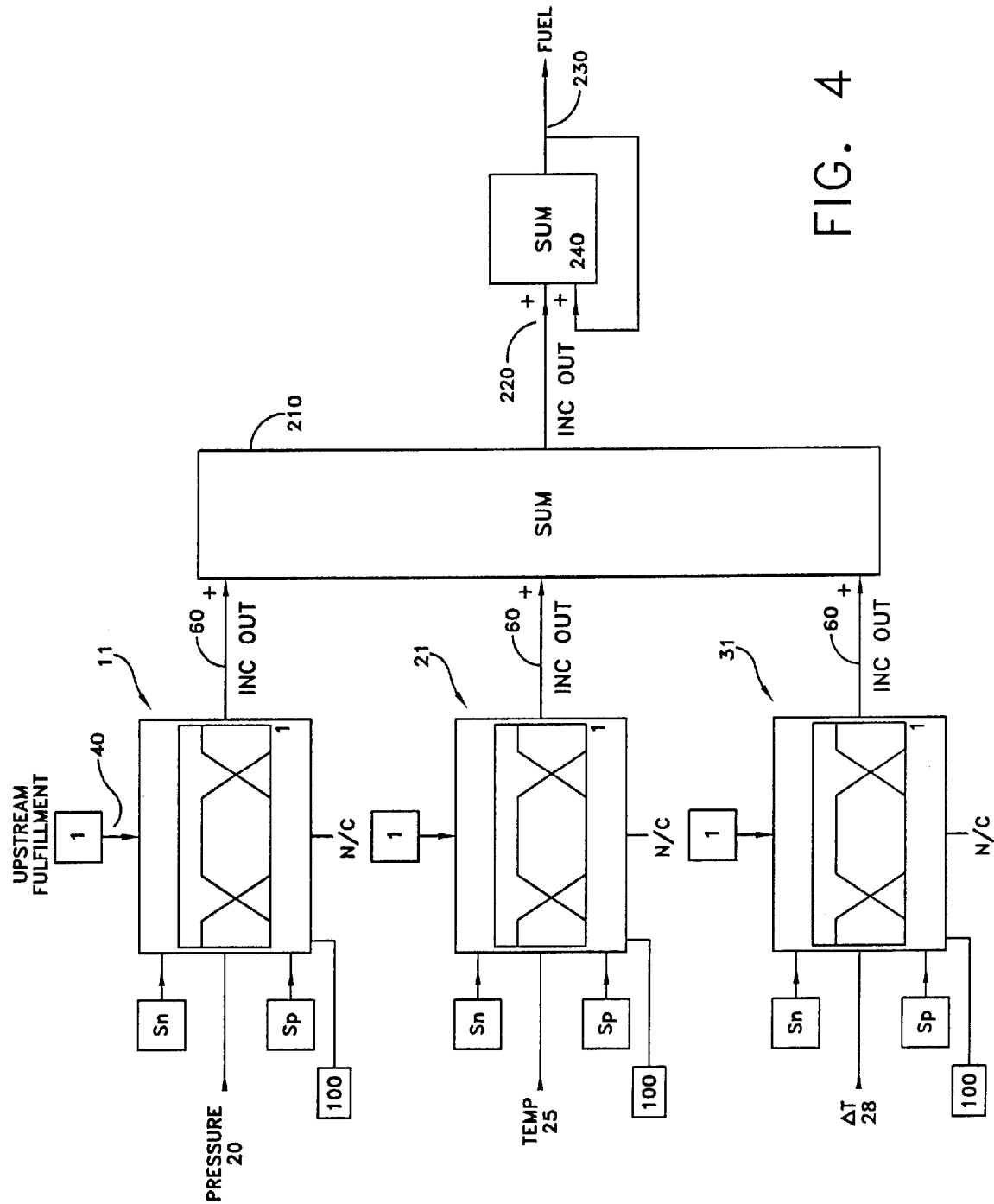
FIG. 4 provides an alternative embodiment of multiple prioritized constraint control system where each constraint has equal priority.

FIG. 4 provides an alternative embodiment to the control system of FIG. 3, where all controllers have equal priority, because all upstream fulfillments have a constant input of 1.0. In this case, all fuzzy logic controllers compete evenly to influence the output signal 230.

Figure 6:
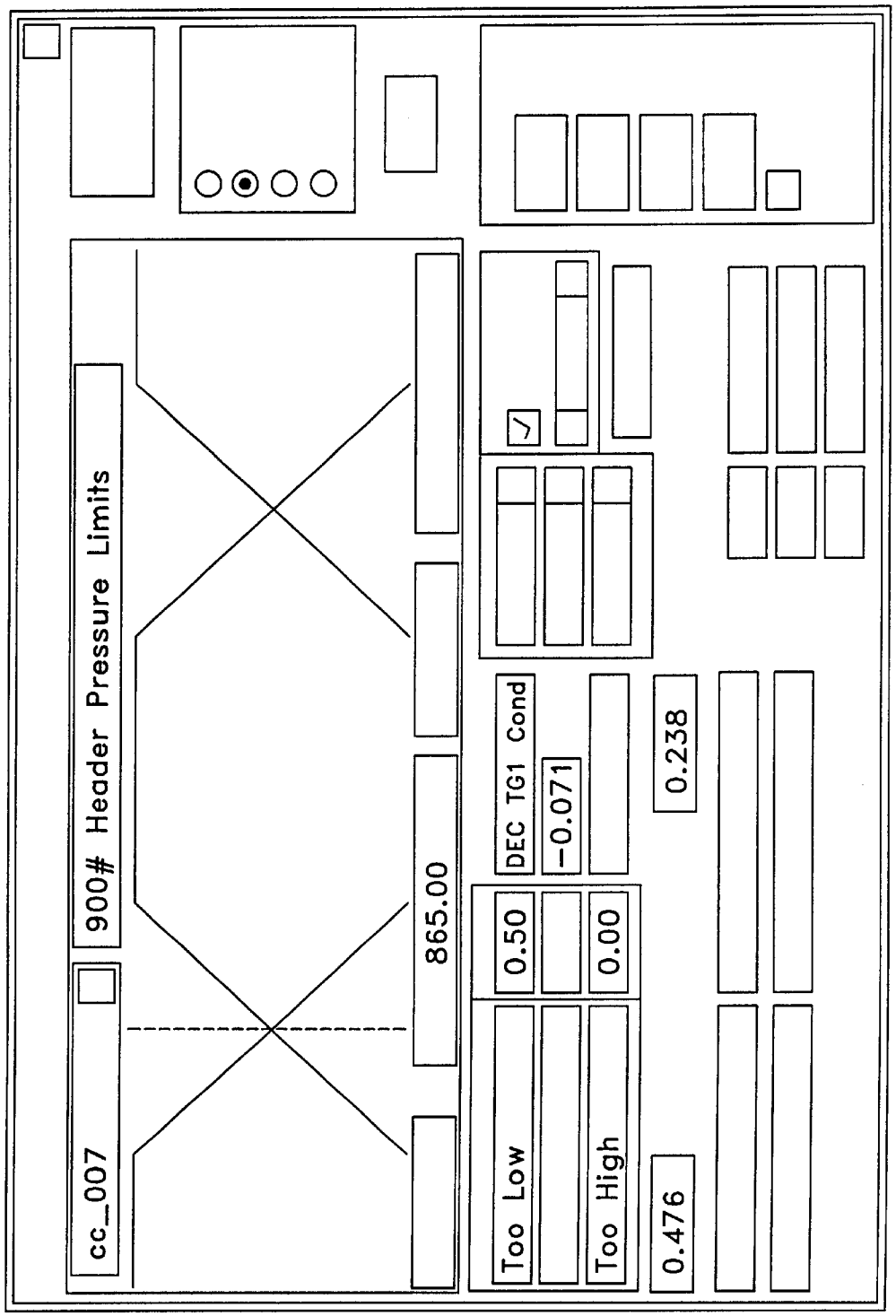
FIG. 6 provides a graphic display of a single variable priority constraint controller.

As one can ascertain, the present invention permits a number of control variables to simultaneously influence and "vote" as to the magnitude and polarity of the connection to be applied to the controlled output. The control system may be coupled to a computer terminal having graphics software for providing a user with a status of the control system parameters including their current values and level of influence over the controlling process. FIG. 5 shows a ten variable SVPCC control system being tested against a model for an industrial facility turbine controller while FIG. 6 shows a graphic that allows configuration and display of a single variable priority constraint controller.

Figure 7A:
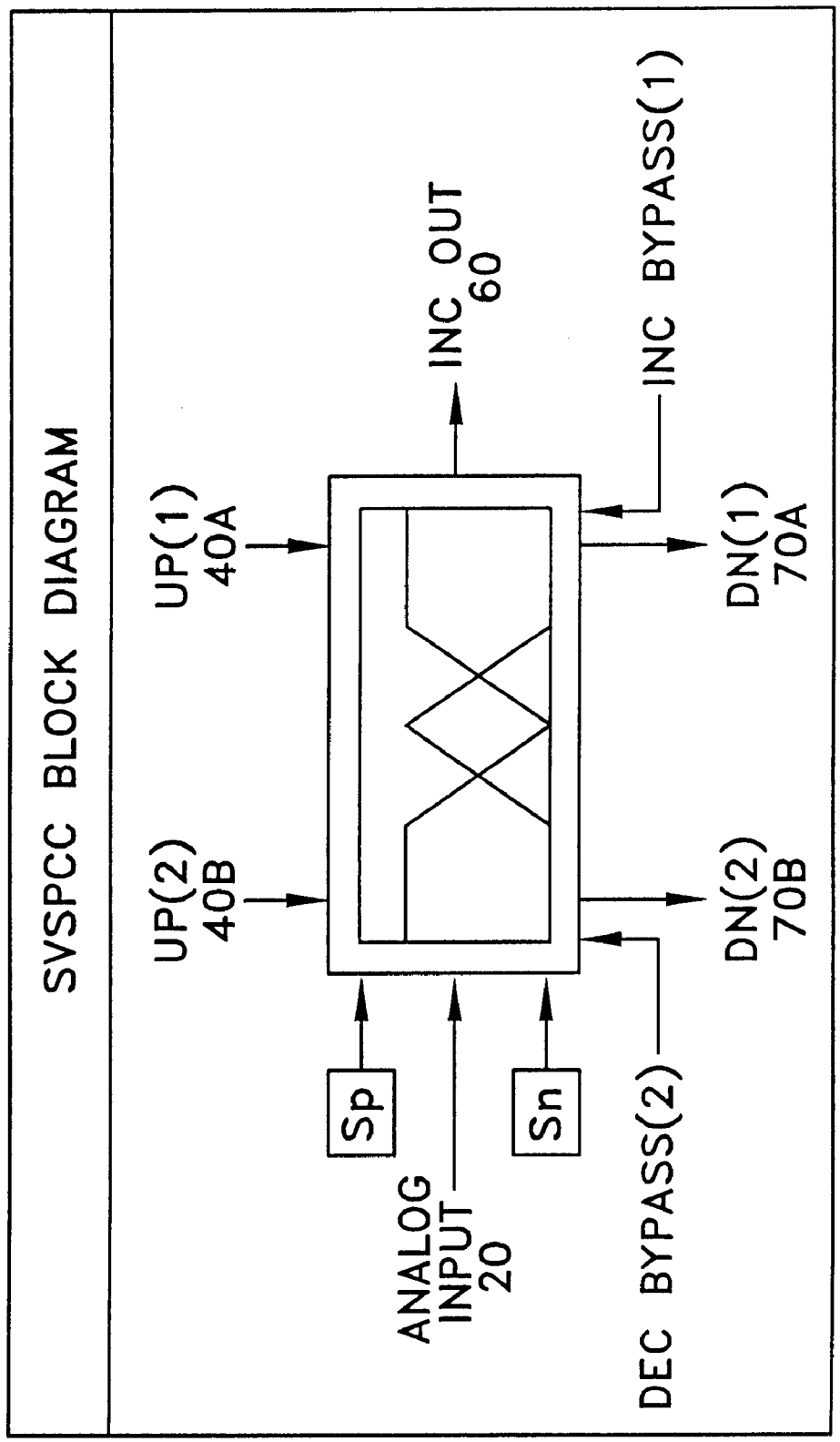
FIGS. 7A and 7B provide schematic and detailed illustrations respectively, of a single variable split priority constraint controller for separate increase and decrease move permissives according to an alternative embodiment of the present invention.
Figure 7B:
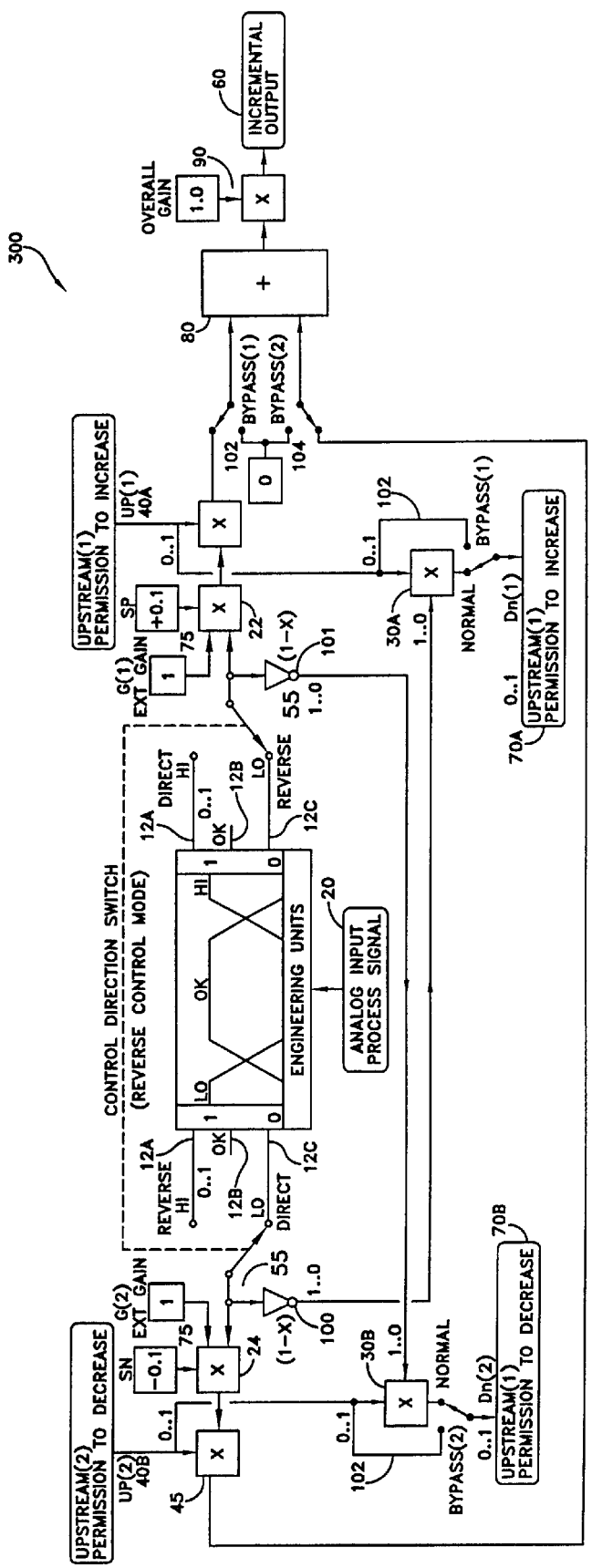
Figure 8:
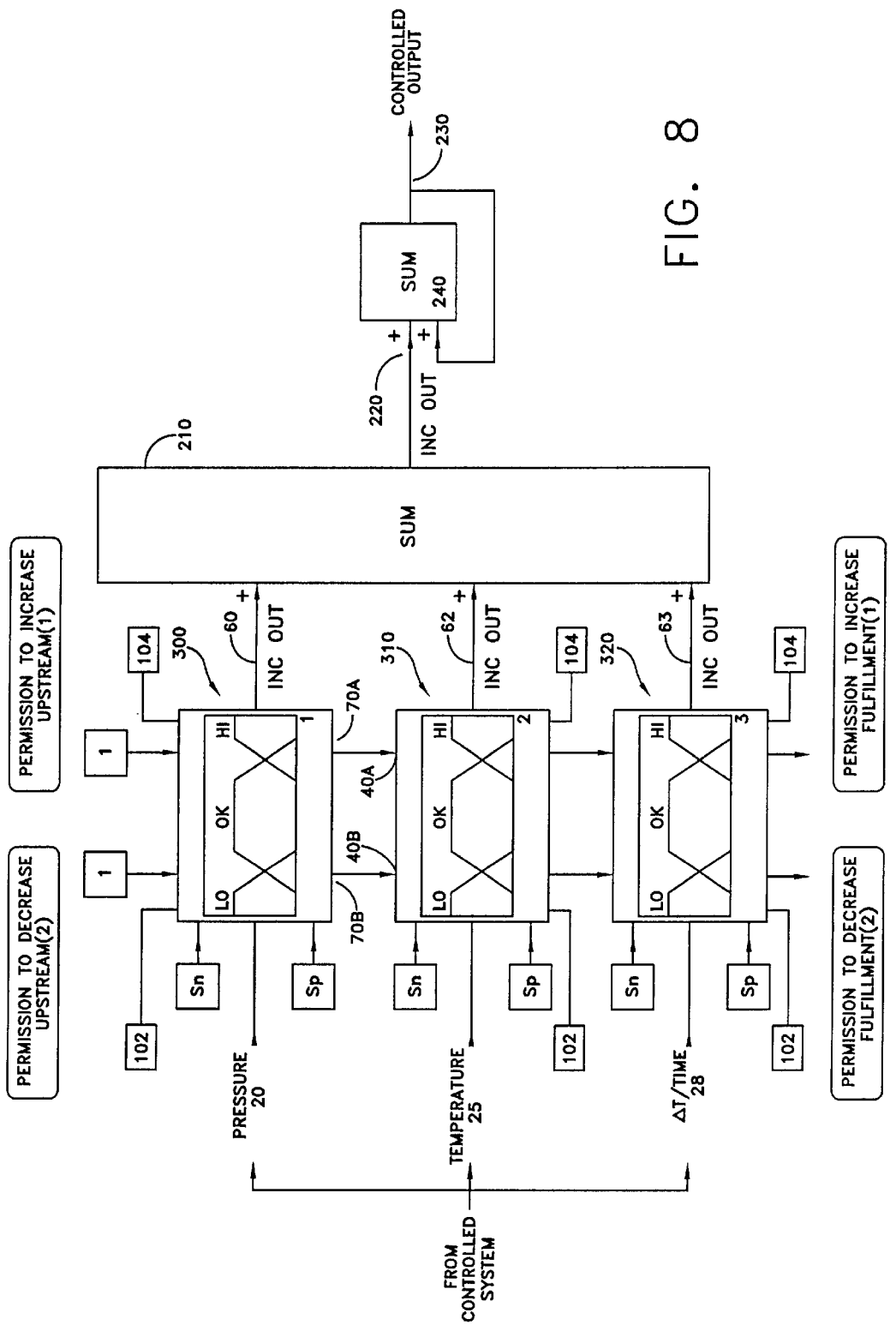
FIG. 8 provides a schematic of the control system of FIG. 7 having control connections with separate increase and decrease move permissives.

In another embodiment of the present invention, shown in FIGS. 7A and 7B, there is provided a single variable constraint controller having split priority signals to provide separate increase and decrease move permissives. This single variable split priority constraint controller 300 or tunnel controller may be used to implement a variety of control strategies without the use of a single PID controller. A controller 300 is configured for each process constraint. The split priority controller system comprises a cascade of such controllers 300, 310, 320 as shown in FIGS. 7B and 8 and operates as follows. The controllers are chained together in a required order or priority as in the prior embodiments. Each controller's process input (20, 25, 28) is then split into three membership truths. Each membership is given a name such as low, normal (O.K.), and high, with inputs assigned probability truths between 0 and 1. As in the previous embodiment, the sum of all three truths must equal to 1. The typical input signal 20 may have a 35% probability of being low, 65% probability of being normal, and 0% probability of being high. Permission signals to increase (70A) and decrease (70B) the incremental output 60 are passed vertically, from a higher priority controller to lower priority controllers (e.g. 310). If the first controller 300 is in the normal range, then both HI signal 12A and LO signal 12C are 0. Thus, no incremental output is made and the upstream permissives to increase (signal 70A) and decrease (signal 70B) are passed down to controller 310. If controller 310 input 25 is outside it's normal region, controller 310 "votes" or provides an incremental output signal value 60 to move the input back into its normal region. Controller 310 also operates to inhibit downstream controller 320 from making an opposing move. As one can ascertain from FIGS. 7B and 8, two upstream permission signals 40A and 40B are provided as inputs to fuzzy logic controller 300, while two downstream fulfillment factor signals 70A and 70B are output from each fuzzy logic controller. In this implementation, a particular controller is operable to constrain all downstream controllers, such that the subsequent downstream controllers can not increase the output signal, but would permit any subsequent downstream controllers to decrease their incremental output. The inverse situation may also apply, where a particular controller constrains downstream controllers from decreasing their incremental outputs while permitting an increase in such outputs. That is, the upstream and downstream fulfillment means are independent of one another. Referring to FIG. 7, the upstream signal 40A provides permission to increase the incremental output based on the particular input variable analog input process signal 20, provided at the input terminal of controller 300, while upstream signal 40B provides permission to decrease.

The operation of a controller system comprising a plurality of single variable split priority constraint controllers, as shown in FIG. 8, will now be described within the context of a particular example. The controller system shown in FIG. 8, may be operable for example, to control a fuel valve to a hot water heating system where a first controller 300 receives an analog process signal 20 from a sensor within the controlled system (not shown) indicative of the pressure P of the heater, the second controller 310 is receiving a second process signal indicative of the variable temperature T of the heater and a third controller 320 receives a process signal indicative of the change in temperature ΔT over a predetermined time interval. The control system output signal 220 is indicative of a measure of increase or decrease of the output variable, fuel (i.e, gas) provided to the burner output. Accordingly, the membership functions rules 15 for the first controller 300 may be such that if the pressure P is within the normal or OK range, then do nothing (0 incremental output); if the pressure is low, then increase the fuel output; and if the pressure is high, then decrease the fuel output. Similarly, the downstream controller 310, which receives temperature T at it's analog input 25, includes membership functions such that if the temperature is "low", then provide a positive incremental output (increase the output), if the temperature is in the "normal" region, then do nothing (0 output), and if the temperature is in the "high" region, then provide a negative incremental output (decrease output). Controller 320, which monitors the rate of change of temperature (for example, to prohibit bursting of pipes as a result of a dramatic temperature variation), may include membership functions and rules operable such that if the rate of change of temperature ΔT is in the "normal" region, indicative of a steady rate of change, then 0 incremental output is provided; if the rate of change is "low", indicative of a dropping rate, then increase the fuel output (increase output), and if the rate of change ΔT is high, indicative of an increase in the temperature variation rate, then decrease the fuel output (decrease output). In this instance, controller 320 operates to maintain a steady rate of change in temperature, so as to either heat up or cool down the system at a constant or nearly constant rate. However, as the input process signal 25 increases, temperature controller 310 moves from the normal region to a high region, (i.e. the truth of the temperature signal T being high increases, while the truth of the "normal" region decreases) the incremental output signal 62 associated with controller 310 decreases in value. Thus, the value of incremental output 62 is indicative of a request by controller 310 to decrease the amount of fuel supplied to the system. Simultaneously, the decrease in value of the "normal" region at controller 310 operates via inverter 100 and multiplier 30A (see FIG. 7B) to reduce the ability of the downstream controller 320 to provide an incremental output 63 indicative of an increase, by reducing the output fulfillment permission 70A from controller 310 input to controller 320. Therefore, controller 310 can operate to limit the downstream controller's permission to increase its incremental output, while not constraining the downstream controller 320's ability to decrease its incremental output. In this manner, the temperature controller 310 operates to constrain the change in temperature controller 320 downstream. (Note that inverter 101 and multiplier 30B operate in similar fashion to modify fulfillment permission signal 70B). Similarly, pressure controller 300, which is higher priority than either the temperature controller 310 or the change in temperature controller 320, operates to constrain both the temperature and change in temperature controller outputs depending on the input pressure signal P at controller 300. In this manner, all three controllers 300–320 operate to control the gas valve and the level of fuel to the heating system.

Further, as one can ascertain from FIG. 8, each incremental output from each of controllers 300–320 is summed by adder unit 210 so that each incremental output is indicative of how much a particular controller "votes" to increase or decrease the gas level from a current level. For example, if the incremental output 60 is indicative of an increase in gas output of 1%, incremental output 62 is indicative of a no-change value and incremental output signal 63 provides a value indicative of a decrease of 4% from the current level, then the combined incremental output signal 220 will represent a decrease in gas of 3% from the existing level. Thus, each controller "votes" as to the output level of increase or decrease of the overall output. However, as one can ascertain, because of the cascaded nature of the system, and because the first 70A (permission to increase) and second 70B (permission to decrease) downstream fulfillment factors are independent of one another, some "votes" are weighted more heavily than others. Note further that in the preferred embodiment shown in FIG. 7, the upstream permission to increase signal 40A is always operable to only increase, while the upstream permission to decrease signal 40B operates solely to decrease. Thus, each controller is operable in a reverse control mode, wherein if the input process signal 20 is high, then the corresponding incremental output signal is going to be indicative of a decrease from the current value and if the input signal is low, then the incremental output signal is a value indicative of an increase from the present level. Note that the membership functions and associated control action (i.e. increase/decrease output based on input signal variable) must be determined on a controller basis.

Similarly, a controller may operate in a direct control mode, wherein if the input signal is low, then the logic within control unit 300 is such that the incremental output is indicative of a decrease from the present level, while if the input signal is high, the incremental output operates at a value greater than the present value.

FIG. 7B illustrates a reverse control mode of operation which uses a control direction switch 55 which may be implemented as a double pole/double throw switch for switching between direct control and reverse control mode. Controller 300 also provides input terminals 75 for receiving signals indicative of an external gain in order to allow external stimulus to impact, control, and/or modify incremental output, as well as to provide multiple variables to constrain the controller.

It should be noted that while signal adjustor input $S_n$ and $S_p$ indicative of a small negative and small positive movement respectively, have, in the preferred embodiment, values of –0.1 and +0.1, those values may assume a variety of values ranging between –100 to +100. Moreover, the external gain inputs 75 permit an external stimulus to exert an effect on the control system, thus permitting external variables to influence the system. Note that the external gain factor is a value ranging from 0 to 1. When no external gain input is required (or desired) for the control system, such value is preferably set to 1. Note further that, while the embodiments described herein have included control systems having three single variable process input signals, control systems using any number of input variables may be implemented.

Figure 9:
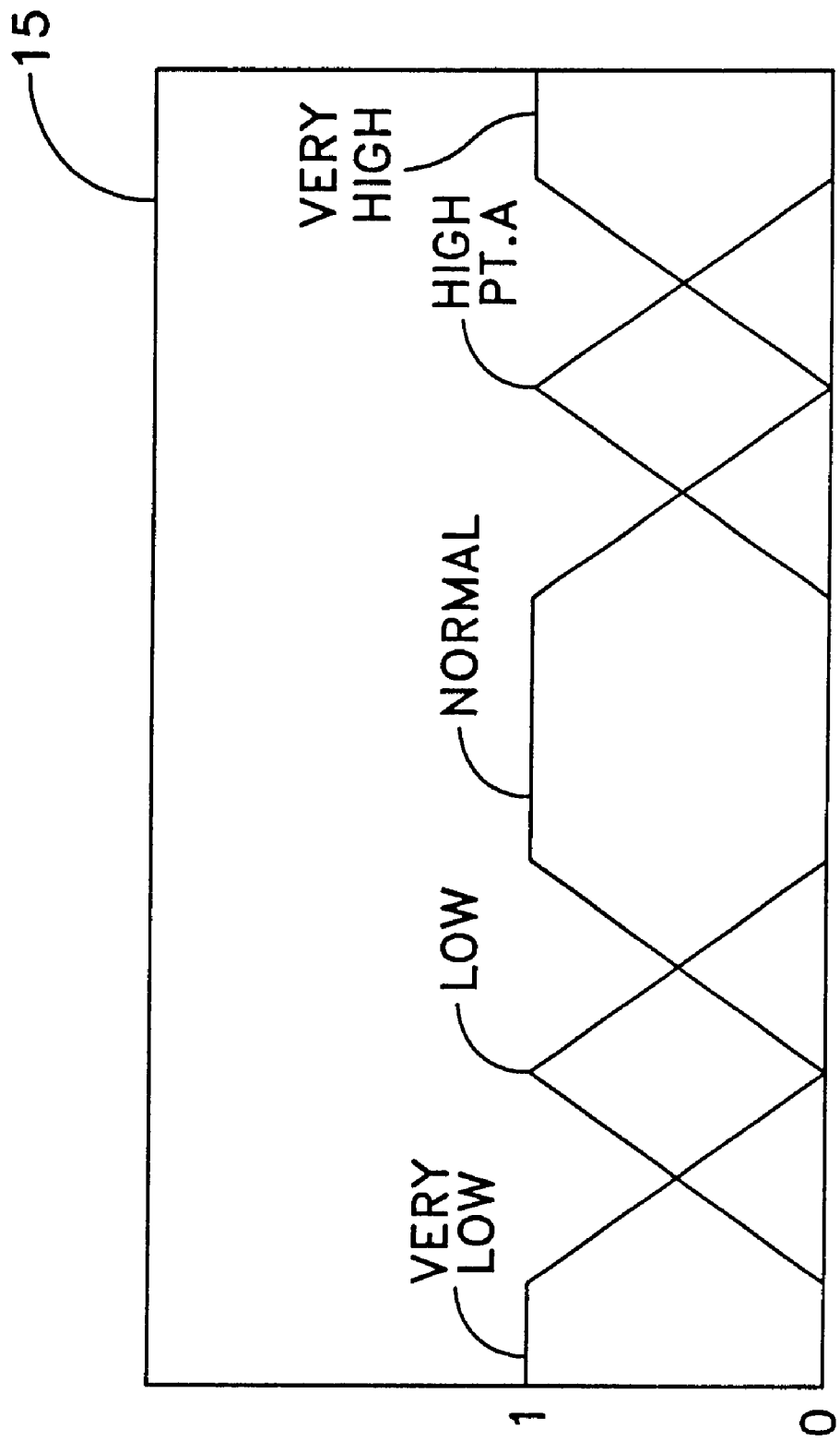
FIG. 9 is a schematic illustration of a membership function set according to the present invention.
Figure 10A:
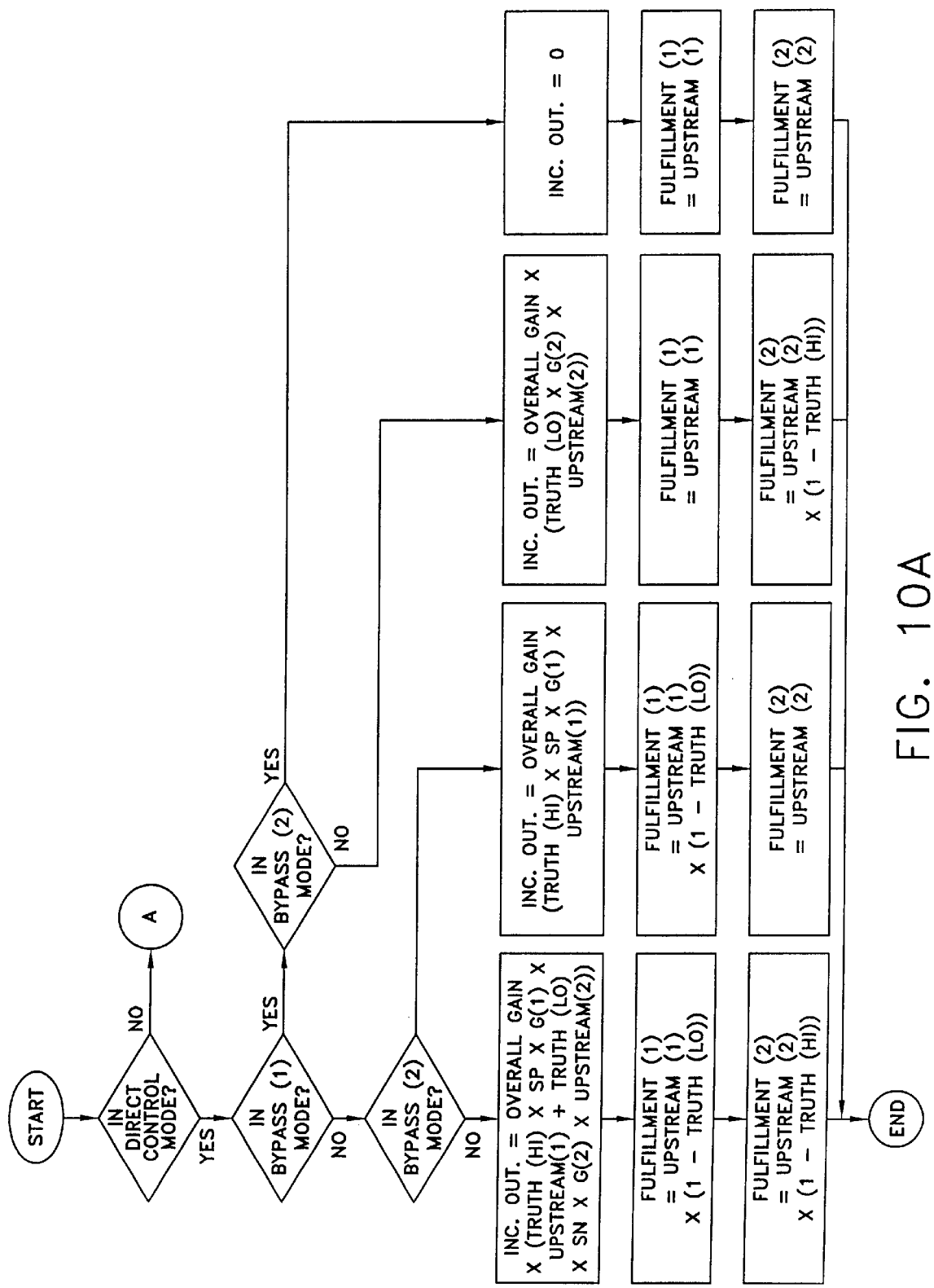
FIGS. 10A and 10B is a flow diagram of the split priority constraint controller system according to the present invention.
Figure 10B:
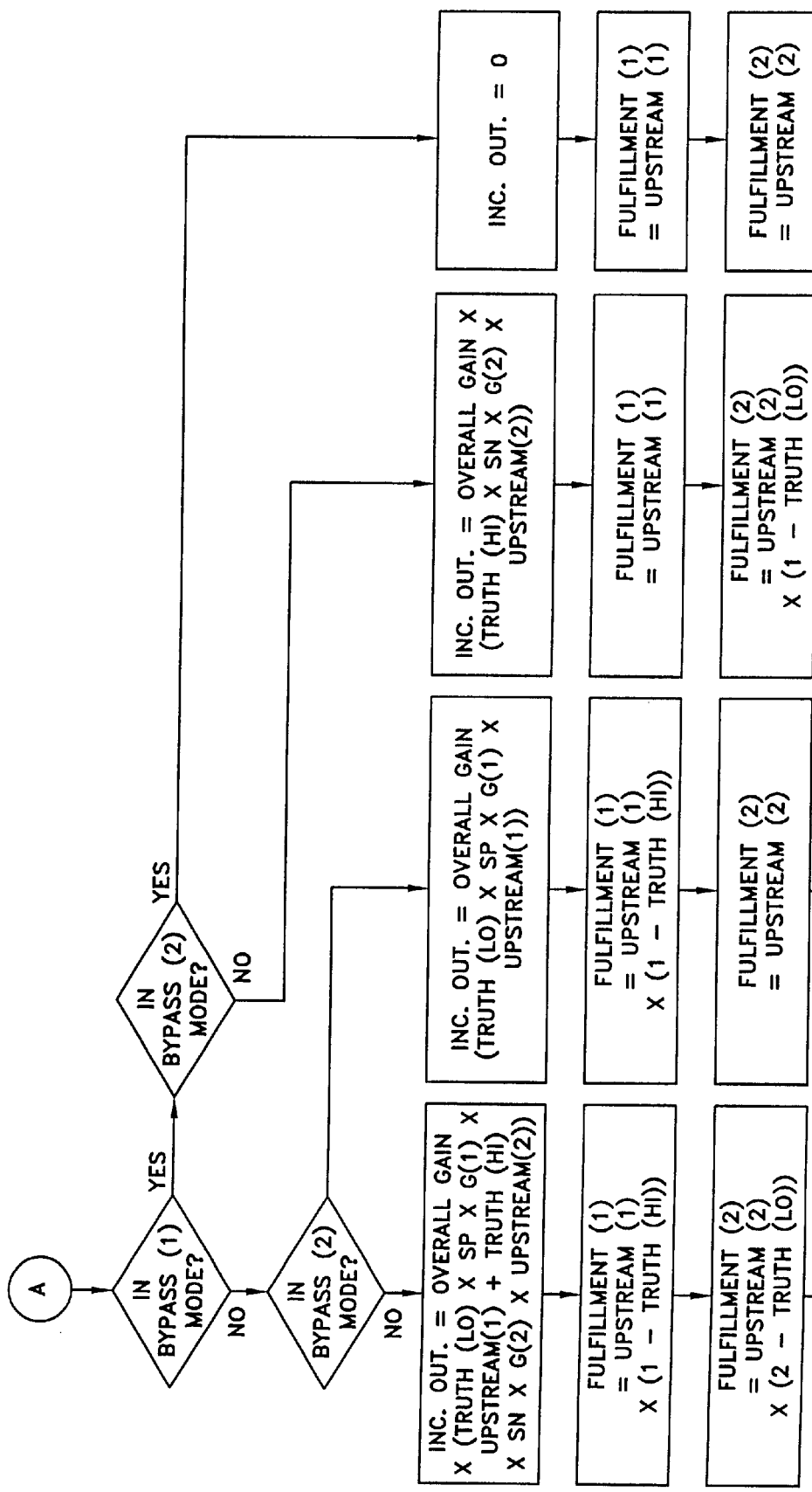

In still another embodiment, the control system of the present invention is operable where a fuzzy controller may have membership functions totaling numbers greater than 3. For example, a particular controller associated with a membership function 15, as indicated in FIG. 9 which illustrates curves indicative of a normal range, a high and very high range, as well as a low and very low range. Controllers such as that described in FIG. 9 provide even greater system control by limiting the degree of oscillation of the output signal around the final value, which result from system noise or arise from conflicts between two or more constraining controllers.

Referring again to the membership function illustrated in FIG. 9 and applying the functions to the block diagram of FIG. 8, the control system according to this embodiment operates such that if the input analog process signal is within the normal range, than no incremental output is produced, and the permissive factor signals to increase or decrease are simply passed down "vertically" to the next downstream controller. If, however, the input signal begins migrating into the high region (that is, as one proceeds down the normal curve and up the high curve of FIG. 9) then the controller operates to begin "turning off" or constraining the downstream controller's permission to increase by reducing the permission to increase signal from 1 towards 0, while still providing a 0 incremental output. When the input signal approaches the peak of the high curve (point A indicative of 0 truth OK, 0 truth very high, and 100% truth high) then all subsequent downstream controllers are completely constrained from increasing their incremental outputs. However, according to the rules associated with the membership functions at this point the fuzzy controller is still not making an output. Accordingly, the signal may be characterized as being in a high "dead-band" region, such that if any further increase of the input process signal into the very high band region occurs, such movement causes a subsequent decrease in the incremental output from the fuzzy controller to push the input signal back down towards the high region. As one can ascertain, this dead-band region may be thought of as a "safe zone" or "well". The safe region operates to reduce any oscillations around a final output resulting from undesired effects such as system noise.

Note that the membership curves may also be modified in a variety of manners or configurations to suit the particular application. Note further that in this particular embodiment, where the number of memberships for a particular fuzzy controller have increased from 3 to 5, the number of tuning parameters $S_n$ and $S_p$ also increase as well. That is, when the controller is in the normal region, no move is made. A small positive and large positive are associated with the low and very low curves respectively, and a small negative and large negative moves are associated with the respective high and very high membership curves.

It should be understood that a person skilled in the art may make many variations and modifications to embodiments utilizing functionally equivalent elements to those described herein. For example, the cascaded fuzzy logic controller system of the present invention comprising a sequential arrangement of single variable controllers may be implemented using conventional hardware elements including ROM/RAM memory coupled to a central processing unit (CPU) and including analog input/output processing units coupled to analog and digital communications buses. Similarly, software implementations of the fuzzy logic controllers are also envisioned and may be implemented by one skilled in the art. Any and all such variations or modifications, as well as others which may become apparent to those skilled in the art, arez intended to be included within the scope of the invention as defined by the appended claims.

What is claimed is:

1. A fuzzy logic controller system comprising:
   a plurality of fuzzy logic controllers cascadably coupled to one another to form a sequence, each controller having:
   membership processing means for receiving a separate input variable from a controlled system and performing fuzzy inference operations for outputting an incremental output signal according to associated membership functions and rules, said incremental output signal indicative of a request from each controller to change a controlled output from a current level; and downstream fulfillment means responsive to said membership processing means and to at least one previous controller in said sequence of cascadably coupled controllers for providing a fulfillment signal indicative of a permissible range of freedom for scaling an incremental output signal of another one of said controllers in said cascading sequence, wherein said fulfillment signal operates to constrain the incremental output signal and influence of a subsequent downstream controller.

2. The control system according to claim 1, each said controller further comprising permission means responsive to said membership processing means and to an upstream controller for receiving a fulfillment signal from said upstream controller indicative of the degree of permission from said upstream controller to increase the incremental output for scaling said incremental output signal, wherein said permission means is coupled to said fulfillment means for each controller.

3. The control system according to claim 2, further comprising adding means responsive to an incremental output signal from each of said plurality of cascading fuzzy logic controllers for summing together each said incremental output signal and applying said sum to said controlled output for providing a correction to said current level of said controlled output.

4. The control system according to claim 3, wherein said membership processing means includes a processor having a plurality of said membership functions and rules associated with said separate input variable for providing a first signal indicative of a low range associated with a first membership and rule function, a second signal indicative of a normal range associated with a second membership and rule function, and a third signal indicative of a high range associated with a third membership and rule function.

5. The control system according to claim 4, wherein said membership processing means further comprises combining means for combining at least two of said first, second, and third signals to produce said incremental output signal for input to said permission means.

6. The control system according to claim 5, wherein said combining means comprises:
first multiplying means for multiplying said first signal with a first movement signal;
second multiplying means for multiplying said third signal with a second movement signal; and
adder means for adding said multiplied first and third signals to provide said incremental output signal,
wherein said first and second movement signals each have a magnitude and polarity opposite one another and indicative of a desired amount of change of said single input variable.

7. The control system according to claim 6, wherein said combining means further comprises gain means coupled between said adder means and said permission means for adjusting the magnitude of said incremental output signal.

8. The control system according to claim 4, wherein for each controller said fulfillment means comprises a multiplier for multiplying said second signal indicative of a normal range value with a fulfillment signal from an upstream controller to provide said fulfillment signal to a subsequent controller in said sequence.

9. The control system according to claim 3, further comprising bypass means associated with each said fuzzy logic controller for bypassing a particular fuzzy logic controller in said cascading sequence to eliminate said bypassed controller influence on said controlled output and on said downstream controllers.

10. The control system according to claim 1, wherein said fulfillment signal indicative of a permissible range of freedom for scaling said incremental output signal of another controller has a value ranging between 0 and 1.

11. The control system according to claim 1, wherein for a given one of said plurality of controllers, when said fulfillment signal for said given controller is unity, said given controller outputting said fulfillment signal and a downstream controller receiving said fulfillment signal have equal priority.

12. A fuzzy logic controller system comprising:
a plurality of fuzzy logic controller units cascadably coupled to one another to form a sequence, each controller unit having:
membership processing means for receiving a single input signal corresponding to a sensed parameter from a controlled system and performing fuzzy inference operations based on said input signal for outputting an incremental output signal indicative of a requested change in a controlled output from a current level,
permission means for scaling said incremental output signal in response to a fulfillment signal from another controller unit;
fulfillment means responsive to said membership processing means and to said permission means for providing a fulfillment signal to another downstream controller unit indicative of a permissible range of freedom for scaling an incremental output signal of said another downstream controller unit in said cascading sequence; and
summing means for summing each incremental output signal from said plurality of controller units and applying said sum to said controlled output for providing a correction to said current level of said controlled output;
wherein said fulfillment signal output from a particular controller unit operates to constrain the incremental output signal and influence of subsequent downstream controller units.

13. The system according to claim 12, wherein said membership processing means comprises a processor having a plurality of membership functions and rules associated with said single input signal and operable to output a plurality of membership value signals associated with said membership functions and rules according to a value associated with said single input signal.

14. The system according to claim 13, wherein said permission means comprises:
increase permission means for receiving one of said plurality of membership value signals and a fulfillment signal from an upstream controller indicative of a degree of permission to increase the incremental output signal and scaling said received membership value signal by said degree to provide a scaled membership value signal;
decrease permission means for receiving another of said plurality of membership value signals and a fulfillment signal from an upstream controller indicative of a degree of permission to decrease the incremental output signal and scaling said received another membership value signal by said degree to provide a scaled membership value signal; and means for summing said scaled membership value signals from said increase and decrease permission means to provide said incremental output signal.

15. The system according to claim 14, wherein said membership processing means further comprises a first inverter for inverting one of said plurality of membership value signals, and a second inverter for inverting another of said plurality of membership value signals, and wherein said fulfillment means comprises:

increase fulfillment means coupled to said increase permission means and said first inverter for receiving a fulfillment signal from an upstream controller and said inverted membership signal for providing an increase fulfillment signal to a downstream controller indicative of the degree of permission in which to increase the incremental output signal of said downstream controller; and decrease fulfillment means coupled to said decrease permission means and said second inverter for receiving a fulfillment signal from an upstream controller for providing a decrease fulfillment signal to a downstream controller indicative of the degree of permission in which to decrease the incremental output signal of said downstream controller.

16. The control system according to claim 15, wherein said increase and decrease fulfillment means associated with a riven one of said plurality of controller units operate independent of one another to permit said given controller unit to constrain an incremental output signal of a downstream controller unit in only one direction.

17. The control system according to claim 14, wherein said plurality of membership value signals comprise a first signal indicative of a low range associated with a first membership function of said single input signal, a second signal indicative of a normal range associated with a second membership function of said single input signal, and a third signal indicative of a high range associated with a third membership function of said single input signal.

18. The control system according to claim 12, wherein each said processor is operable according to said membership functions and rules in a first direct control mode such that a directional change in said single input signal resulting in a change in truth values of said membership functions operates to cause a corresponding directional change in said incremental output signal in a same direction as said directional change in said single input signal, and in a second reverse control mode such that a directional change in said single input signal resulting in a change in truth values of said membership functions operates to cause a corresponding directional change in said incremental output signal in a direction opposite that of said directional change in said single input signal.

19. The control system according to claim 12, further comprising external gain means coupled to said permission means for adjusting the magnitude of said incremental output signal based on an input variable from an external source.

20. The control system according to claim 12, wherein a first controller unit in said cascading sequence has priority over all other subsequent controllers when said fulfillment signal associated with said first controller has a value less than unity.

21. The system according to claim 12, wherein when a particular controller has an associated fulfillment signal equal to unity, said particular controller and a next downstream controller in said cascade sequence have equal priority.

22. A method for operating a fuzzy controller group control system, including a plurality of fuzzy controllers, for controlling an output parameter, comprising the steps of:

for each of said plurality of fuzzy controllers, receiving a separate single input variable from a controlled system and performing fuzzy inference operations for outputting from each of said plurality of fuzzy controllers a corresponding incremental output indicative of a requested change in said output parameter from a current level;

adaptively scaling said corresponding incremental output from each fuzzy controller of said plurality of fuzzy controllers by an at least one signal output from a previous controller indicative of a permissible range of freedom for varying said corresponding incremental output; and summing each said adaptively scaled incremental output from each of said plurality of fuzzy controllers and applying the sum to said output parameter to obtain an updated output parameter.

23. The method according to claim 22, wherein said at least one signal output from a previous controller indicative of a permissible range of freedom for varying said incremental output further comprises an increase permission signal from said previous controller indicative of a permissible range of freedom for increasing said incremental output.

24. The method according to claim 23, wherein said at least one signal output from a previous controller indicative of a permissible range of freedom for varying said incremental output further comprises a decrease permission signal from said previous controller indicative of a permissible range of freedom for decreasing said incremental output.

25. The method according to claim 22, further comprising the step of coupling each of said plurality of fuzzy controllers in a cascading manner to form a sequence.

26. The method according to claim 25, further comprising the step of bypassing at least one of said plurality of fuzzy logic controllers in said cascaded sequence to eliminate said at least one bypassed controller from influence on subsequent downstream controllers and on said requested change in said output parameter.

27. A single variable fuzzy logic controller comprising:

membership processing means for receiving an analog input process signal comprising a single input variable indicative of a measured parameter from a controlled system and performing fuzzy inference operations for outputting an incremental output signal indicative of a requested change in a controlled output from a current level, an input terminal for receiving a permission signal indicative of a permissible range of freedom for varying said incremental output signal;

scaling means for adaptively scaling said incremental output signal of said controller by said permission signal.

28. The single variable fuzzy logic controller according to claim 27, wherein said membership processing means comprises a processor having a plurality of membership functions and rules associated with said single input variable for providing a first signal indicative of a low range associated with a first membership and rule function, a second signal indicative of a normal range associated with a second membership and rule function, and a third signal indicative of a high range associated with a third membership and rule function.

29. The single variable fuzzy logic controller according to claim 28, further comprising a multiplier for scaling said second signal by said permission signal to provide an output fulfillment signal corresponding to a controlling factor associated with said controller.

30. The fuzzy logic controller according to claim 27, wherein said single variable fuzzy logic controller is coupled to another controller at said multiplier for providing said fulfillment signal to said another controller indicative of a level of control exercised by said controller over said another controller.

31. The fuzzy logic controller according to claim 30, wherein said single variable fuzzy logic controller is coupled at said input terminal to another controller for receiving said permission signal.

32. A single variable fuzzy logic controller comprising:

a membership processor for receiving an input variable indicative of a parameter from a controlled system and performing fuzzy inference operations thereon for outputting an incremental output signal indicative of a requested change in a controlled output from a current level;

an input terminal for receiving a control signal indicative of a permissible range of freedom for varying said incremental output signal; and a processor for adaptively scaling said incremental output signal of said controller according to said control signal.

33. The fuzzy logic controller according to claim 32, further comprising a processor responsive to said control signal for providing an output control signal to a downstream controller for constraining variation of an incremental output signal output from said downstream controller.

* * * * *